(No Model.)
K. A. LIVINGOOD.
EGG BEATER.
No. 282,738. Patented Aug. 7, 1883.
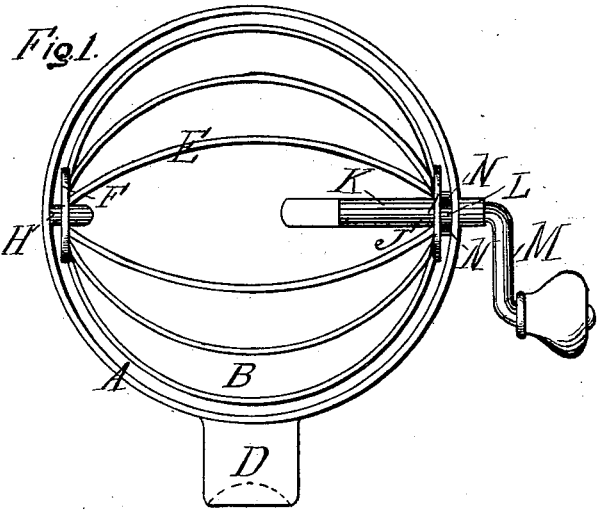
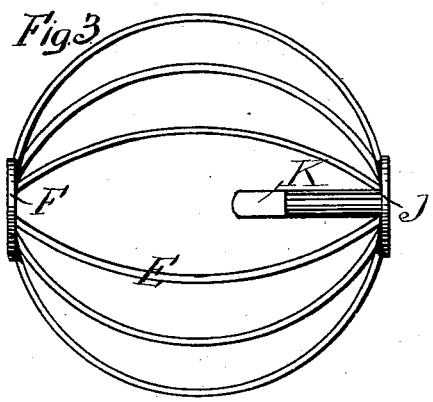
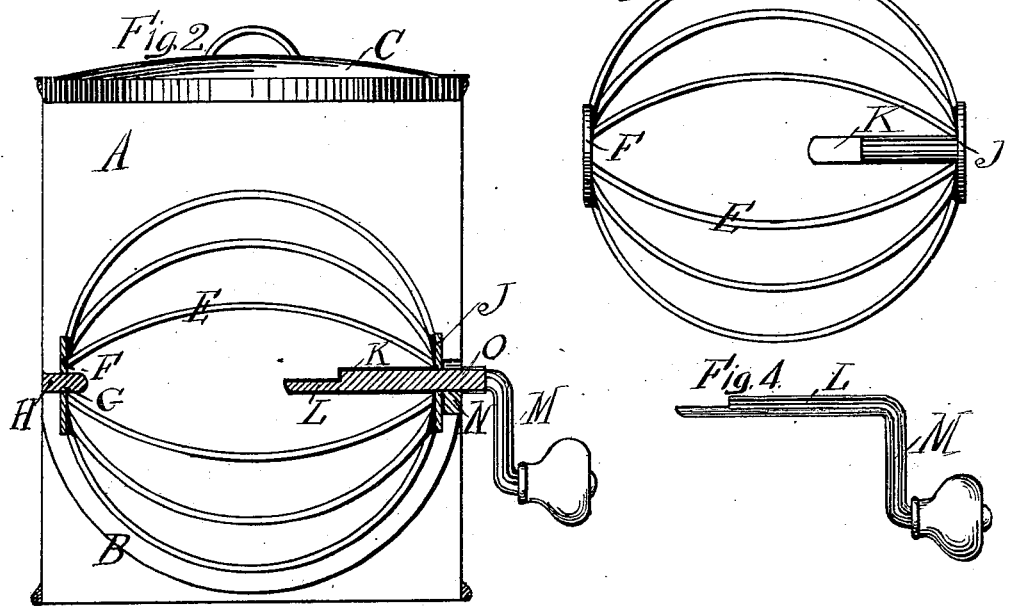
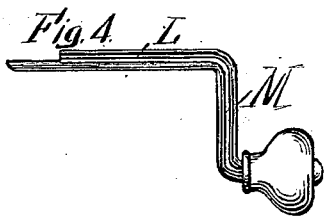
WITNESSES:
Linn Wheeler
J. Daniel Eby
INVENTOR
Katherine A. Livingood.
by her atty
Wm. H. Livingood.

UNITED STATES PATENT OFFICE.

KATHERINE A. LIVINGOOD, OF WOMELSDORF, PENNSYLVANIA.

EGG-BEATER.

SPECIFICATION forming part of Letters Patent No. 282,738, dated August 7, 1883.

Application filed June 5, 1883. (No model.)

*To all whom it may concern:*

Be it known that I, KATHERINE A. LIVINGOOD, a citizen of the United States, residing in the borough of Womelsdorf, in the county of Berks and State of Pennsylvania, have invented a new and useful Implement for Beating Eggs for Culinary Purposes; and I do hereby declare the following to be a sufficiently full, clear, and exact description thereof to enable others skilled in the art to make and use the said invention.

This invention has for its object the quick beating of eggs with small labor and the avoidance of splashing during the operation, and at the same time to use an apparatus easily cleaned in all its parts, and of such simple construction as to be easily understood by persons of ordinary intelligence.

To effect these results the nature of this invention may be briefly stated to consist of a reel of wire arranged to rotate in a cylindric vessel having a hemispherical bottom in close proximity to the reel, and a crank-handle extending through the side of the vessel by which the reel is rotated, the construction of the reel and its shaft, and the bearings or supports thereof, being such as to permit of the reel being withdrawn and replaced with facility. A lid is fitted to the top of the vessel so as to prevent splashing.

I will now proceed to particularly describe the mode of making and using the said invention, referring in so doing to the drawings annexed and the letters of reference marked thereon.

Figure 1 shows a plan of the implement with the cover removed; Fig. 2, a vertical section; Fig. 3, the reel, and Fig. 4 the crank as detached.

The same letters of reference apply to the same parts in the several figures.

A represents a cylindric vessel having a hemispherical bottom, B, and provided with a removable lid, C, and also a handle, D.

E represents a spherical reel made of wires, of such dimensions as to fit snugly, but without contact with, the bottom B.

F is a hub of the reel E, having a circular hole, G, in it, which fits over a pin or pivot, H, fastened to the inside of the vessel, so as to coincide with the greater diameter of the hemispherical bottom B.

J is another hub of the reel E, having a tube or sleeve, K, of such form as to fit over the axle L of the crank M, and to be turned thereby.

N is a bearing fastened in the same plane in the vessel A as the pivot H, but diametrically opposite, and holds the end of the tube K.

An opening, O, is made in the side of the vessel A, so as to permit the crank-axle L to be introduced.

The axle L is made flat in one portion, as is also the tube or sleeve K, so as to cause the reel to turn with the crank M.

To use the apparatus the eggs are broken and placed in the vessel A and the cover or lid C placed on it and the crank M rapidly turned, and the eggs are quickly whipped to the desired consistence and then removed.

To cleanse the apparatus the crank M and shaft or axle L are withdrawn from the tube K in the reel E, when the reel will drop out as soon as the vessel A is inverted, and all parts are thus easily cleansed.

Having described my invention and the mode of using the same, what I claim is—

The combination of the vessel A and reel E with the removable crank M, bearing N, and pivot H, all constructed and arranged substantially as set forth.

KATHERINE A. LIVINGOOD.

Witnesses:
   WM. H. LIVINGOOD,
   H. A. ZIEBER,
   GEORGE J. GROSS, Jr.